(12) United States Patent
Oktay

(10) Patent No.: US 7,464,974 B2
(45) Date of Patent: Dec. 16, 2008

(54) QUICK-FOLD COMPACT TOW-BAR

(76) Inventor: Sevgin Oktay, 2807 mulberry Ct., Poughkeepsie, NY (US) 12603

( * ) Notice: Subject to any disclaimer, the term of this patent is extended or adjusted under 35 U.S.C. 154(b) by 167 days.

(21) Appl. No.: 11/488,299

(22) Filed: Jul. 19, 2006

(65) Prior Publication Data

US 2007/0040399 A1    Feb. 22, 2007

Related U.S. Application Data

(60) Provisional application No. 60/701,403, filed on Jul. 21, 2005.

(51) Int. Cl.
*B64F 1/04* (2006.01)
(52) U.S. Cl. .................. 294/19.1; 16/426; 180/904
(58) Field of Classification Search .............. 294/19.1, 294/169; 280/503, 3; 180/904; 244/50; 16/426, 427, 429
See application file for complete search history.

(56) References Cited

U.S. PATENT DOCUMENTS

| | | | | |
|---|---|---|---|---|
| 2,468,669 A | * | 4/1949 | Holmes | 280/451 |
| 2,944,837 A | * | 7/1960 | Fotheringham | 280/503 |
| 2,994,541 A | * | 8/1961 | Dobbins | 280/3 |
| 3,581,843 A | * | 6/1971 | Hadley | 182/20 |
| 3,829,131 A | * | 8/1974 | Moore, Jr. | 280/493 |
| 4,463,826 A | * | 8/1984 | Pearce | 182/20 |
| 4,535,648 A | * | 8/1985 | Stelzer et al. | 74/544 |
| 4,883,280 A | * | 11/1989 | Christian | 280/3 |
| 4,991,862 A | | 2/1991 | Tsao et al. | |
| 5,649,679 A | | 7/1997 | Perkins | |

* cited by examiner

*Primary Examiner*—Dean J Kramer
(74) *Attorney, Agent, or Firm*—Oktay Enterprises International; Sevgin Oktay

(57) ABSTRACT

A quick-fold compact tow-bar which is especially suited to tow airplanes, such as single-engine Cessna airplanes. The disclosed foldable tow-bar can be unfolded to tow an airplane in an easy and safe manner and folded back to be stowed away in the luggage compartment of the airplane.

7 Claims, 7 Drawing Sheets

QUICK-FOLD COMPACT TOW-BAR

This application claims priority under 35 U.S.C. ¶119(e) of U.S. provisional application U.S. Ser. No. 60/701,403 filed 21 Jul. 2005, the contents of which are incorporated herein by reference.

BACKGROUND

Disclosed is a tow-bar which is especially suited for towing airplanes, such as single-engine Cessna airplanes. The disclosed quickly foldable compact tow-bar can be unfolded to tow an airplane in an easy and safe manner and folded back to stow away in the luggage compartment of the airplane. Normally, tow-bars are made relatively short so that they can be stowed in the luggage compartment of a small airplane.

Tow-bars for towing vehicles including airplanes are known. U.S. Pat. No. 4,991,862 discloses an aircraft towing apparatus, while U.S. Pat. No. 5,649,679 describes an airplane nosewheel fairing cover to prevent the nosewheel from becoming cracked or scratched as an airplane tow-bar is attached or removed from the nose-wheel strut.

FIG. 1 shows front portion of a single-engine Cessna 10 where a tow-bar 20 has been attached to strut 30 over the nose-wheel fairing 40 covering nose-wheel 50. It will be noted that handle 60 of tow-bar 10 is well under the belly 70 of the airplane and is reachable through and between the blades of propeller 80.

As better seen in FIG. 2, tow-bar 20 comprises a tubing material that has substantially been formed into an irregular U-shape having a first end and a second end. The closed first end of the U-tube forms handle 60, while the two legs 63 and 65 form the open second end 90. The two open legs are configured to fit over protrusions on the sides of the strut 30 of the airplane shown in FIG. 1. Usually, the openings at the end of the legs 63 and 65 engage lugs (not shown) on strut 30 shown in FIG. 1, also seen at a different angle in FIG. 4.

In operation, the operator of the tow-bar approaches the airplane by holding the tow-bar by the handle 60 while opening the legs 63 and 65 by pushing a lever 67 forward in the direction of opening 90, as shown in FIG. 3.

Lever 67 is attached to one of the legs 63 at a pivot point "a" while being attached to one end of a connector plate 62 at another pivot point "b" as shown in FIGS. 2 and 3. Opposite end of connector plate 62 is attached to the other leg 65 of tow-bar 20 at pivot point "c".

As lever 67 travels forward in the direction of opening 90, the lever flexes the irregularly U-shaped tubing 20 to open legs 63 and 65 wider 90' as seen in FIG. 3. As pivot point "b" travels past an axis formed between pivot points "a" and "c", lever 67 stops against stop 64, as shown in FIG. 3. One of the legs, either 63 or 65 may now be engaged with a corresponding lug (not shown) on strut 30 and the other leg engaged to the other lug by pulling lever 67 from its stop position. With the tow-bar engaged onto the strut 30, airplane 10 is now ready to be towed, as shown in FIG. 4.

As is shown in FIG. 4, the body force applied to manual towing of airplanes with tow-bars that do not extend beyond the propeller may cause difficulty in moving an airplane which may weigh more than 3000 pounds. This is because, a normal human operator 100 needs to bend forward to reach for the handle 60, usually with one hand 103, while seeking support somewhere else, usually the nearest propeller cone 15, with the other hand 105, as depicted in FIG. 4, thus making it difficult to exert full towing force due to the awkward position of the body of the operator 100. In addition, there is always the hazard of being caught (as has been reported in the past) in between the blades of an unintentionally engaged propeller due to some malfunction of some component in the airplane.

Two-piece and longer tow-bars are also known. However, they need to be assembled and disassembled in each use. Furthermore, even after disassembly, they are not configured to fit in the rear portion of a luggage compartment of a single-engine airplane, such as in Cessnas'. What is needed is an ergonomically sound, compact tow-bar which can be extended, and yet folded and stowed away quickly.

REFERENCES

U.S. Pat. No. 4,991,862 discloses a universal tow and coupling bar for connecting automatically to an aircraft landing nose gear and towing the aircraft during ground transport. The aircraft engaging end of the tow-bar has directional adjustment and is hydraulically controlled in three coordinates. The end of the tow-bar opposite to the aircraft engaging end is semi permanently connected to the aircraft towing vehicle. The aircraft engaging end of the tow-bar contains an automatic hydraulically controlled locking assembly arranged to engage and lock with a mating locking assembly permanently fixed to the aircraft nose wheel structure. In addition to the aforementioned features of the universal tow-bar are means for controlling the length of the tow-bar, interrupting the aircraft's hydraulic steering system, and connecting to the aircraft's telephone system. This invention provides for the automatic coupling of a towing vehicle to most jet aircraft under the control of a single operator functioning from the cab of the towing vehicle.

Another U.S. Pat. No. 5,649,679 shows a protective cover for an airplane nose-wheel fairing. The protective cover prevents a nose-wheel fairing from becoming cracked or scratched as an airplane tow-bar is attached or removed from the nose-wheel strut.

SUMMARY

Aspects disclosed herein include a tow-bar apparatus comprising a first section and a second section; the first section being configured to engage a strut of a landing gear of an airplane; the second section having a joint connector configured to enable the first section and the second section to connect and fold towards and away from each other; the second section providing a handle to tow the airplane. The first section comprises a primary tow-bar having closed end and an open end at the opposing end to engage the strut of the landing gear. The second section comprises an extension arm having the joint connector at one end and the handle at the opposing end. The joint connector has a fastener capable of locking the primary tow-bar and the extension arm in a foldable position.

an apparatus providing a quick-fold compact tow-bar, the compact tow-bar further comprising a primary tow-bar and an extension arm; a joint connector having a first end and a second end; a first set of openings formed through the joint; wherein the first end of the joint connector configured to rotatably receive a first handle of the primary tow-bar, the first handle having one or more second set of openings; the second end of the joint connector configured to fixedly receive a free end of the extension bar; and a second handle opposing the free end of the extension arm for towing an object. The joint connector comprises an upper portion and a lower portion, each portion configured at the first end of the joint connector to rotatably encase the first handle, including the one or more second set of openings, of the primary tow-bar. The openings through the joint connector are formed in the lower and upper portions of the connector in line with each other to allow a pin to be inserted through the openings. The openings formed in-line with each other in the upper and lower portions of the joint connector allow a pin to be inserted through any one of the one or more openings in the encased handle of the primary tow-bar in order to lock the primary tow-bar in any one of the one or more fixed positions with respect to the extension bar.

an apparatus comprising a U-shaped extension bar having a closed end, an open end and a mid-section; the closed end forming a bulbous handle with arms close together extending into the mid-section and ending at the open end of the extension bar; a mechanism attached to the open end; wherein the mechanism is configured to have jaws for grabbing and releasing an object. The mechanism comprises a spring loaded clamp with levers to actuate the opening and closing of the jaws of the clamp. The mechanism also comprises a hinged two-piece enclosure having a rotatable fastener to apply force to secure the object. The object is an airplane tow-bar handle.

DETAILED DESCRIPTION

In embodiments there is illustrated:

a quick-fold compact tow-bar which is especially suited to tow airplanes, such as single-engine Cessna airplanes. The disclosed foldable compact tow-bar can be unfolded to tow an airplane in an easy and safe manner and folded back to be stowed away in the luggage compartment of an airplane.

Figure 5:
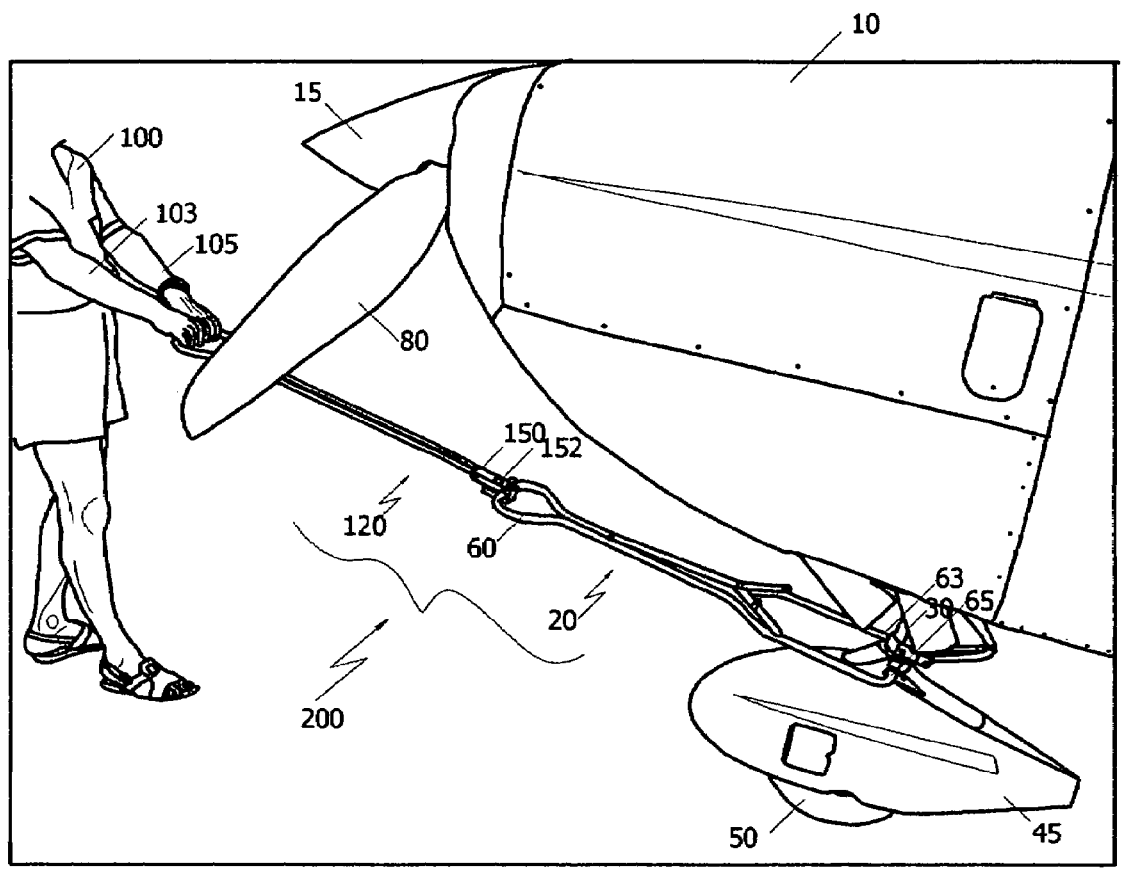
FIG. 5 shows the towing of a single-engine airplane with the quick-folding compact tow-bar of the present invention.

Referring now to the drawings, FIG. 5 shows a quick-fold compact tow-bar 200 of the present invention used in the towing of an airplane 10. In one embodiment, quick-fold tow-bar 200 comprises a first section 20; hereafter referred to as primary tow-bar, similar to the tow-bars, though not limited to, with single-engine Cessna airplanes, and a second section 120, which is foldably attached to the first section 20 as shown in FIG. 5. In an aspect of the embodiment shown in FIG. 5, second section 120 serves as an extension arm to the primary tow-bar of first section 20. When the combination quick-fold tow-bar 200 is folded, the newly formed handle 160 of the extension arm 120 nestles inside the legs 63 and 65 of the primary tow-bar 20, as better seen in FIGS. 6-8.

Figure 1:
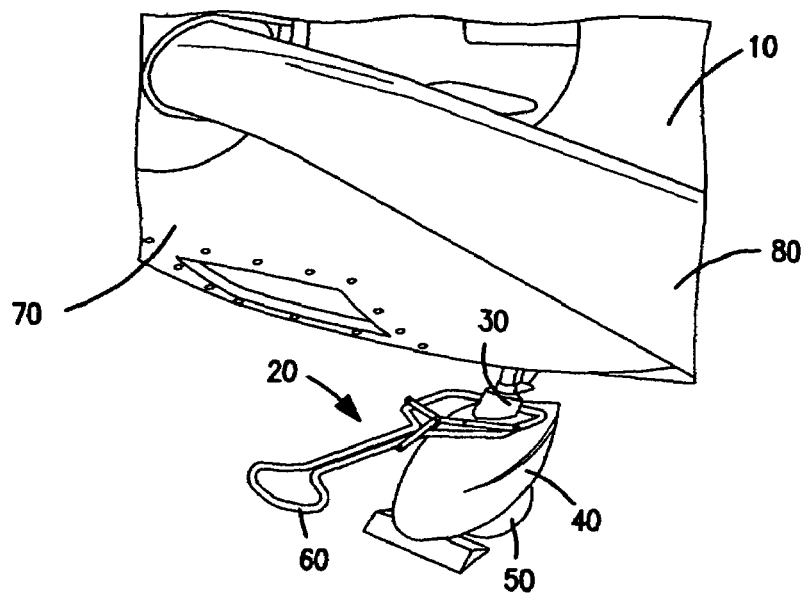
FIG. 1 shows a tow-bar engaged to the strut of a single-engine airplane, according to prior art.
Figure 2:
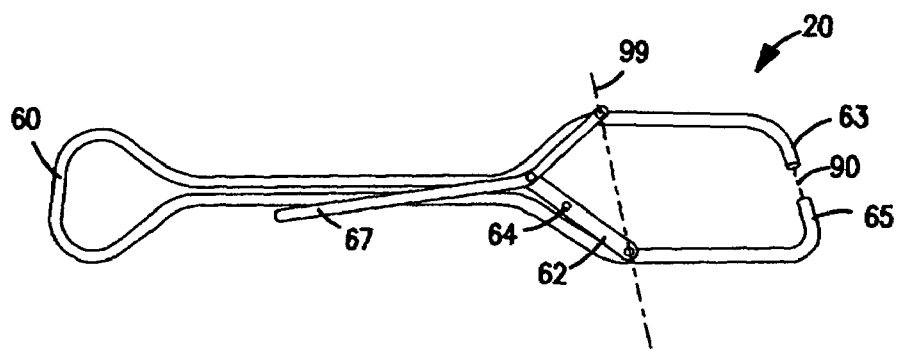
FIG. 2 shows parts of a tow-bar used for towing a single-engine airplane, according to prior art.
Figure 3:
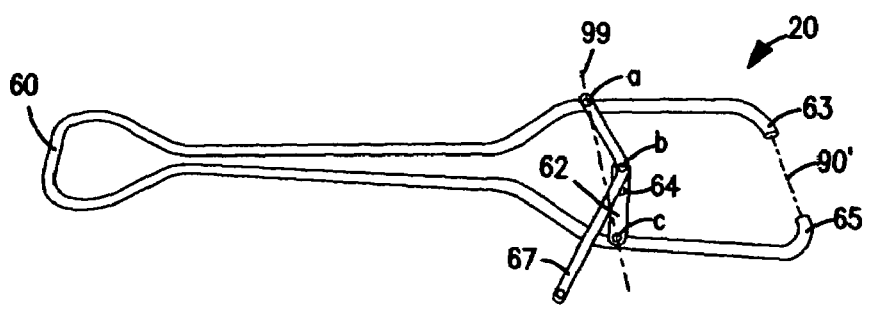
FIG. 3 shows the operation of a lever of the tow-bar of FIG. 1, according to prior art.
Figure 4:
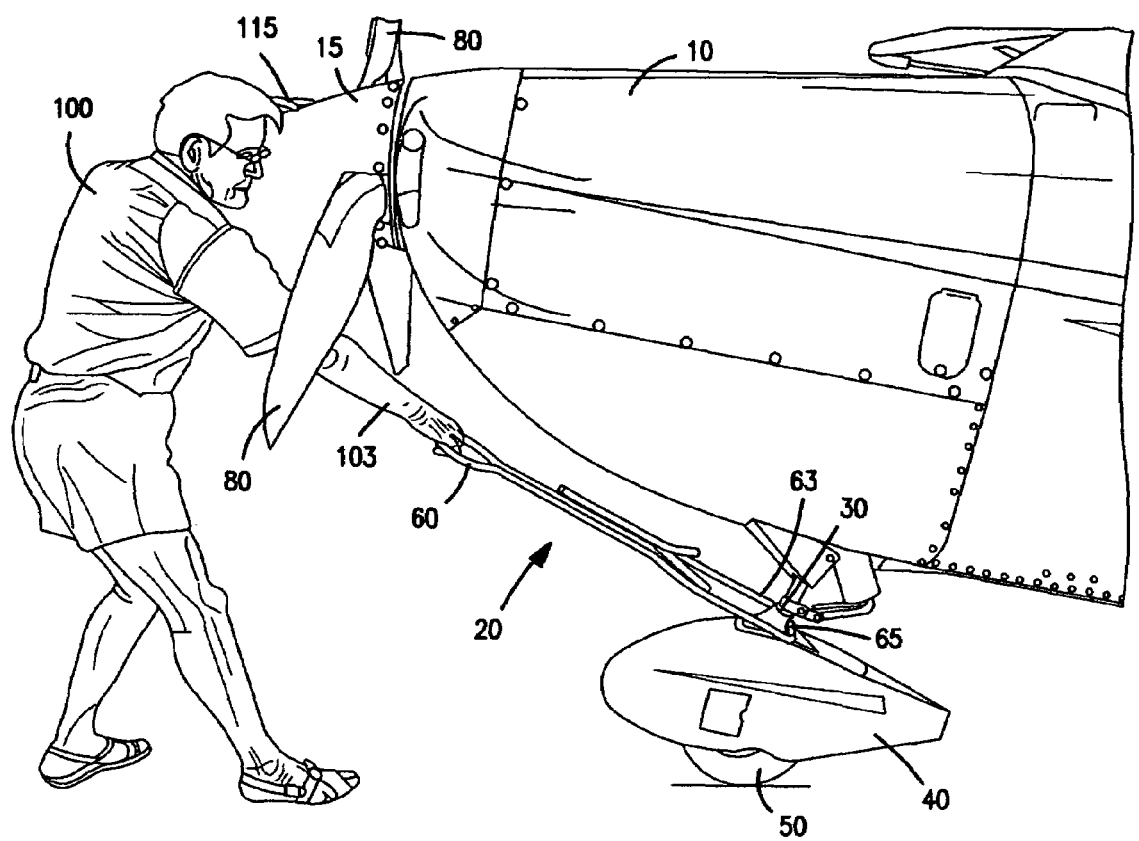
FIG. 4 shows the towing of a single-engine airplane with a tow-bar, according to prior art.
Figure 6:
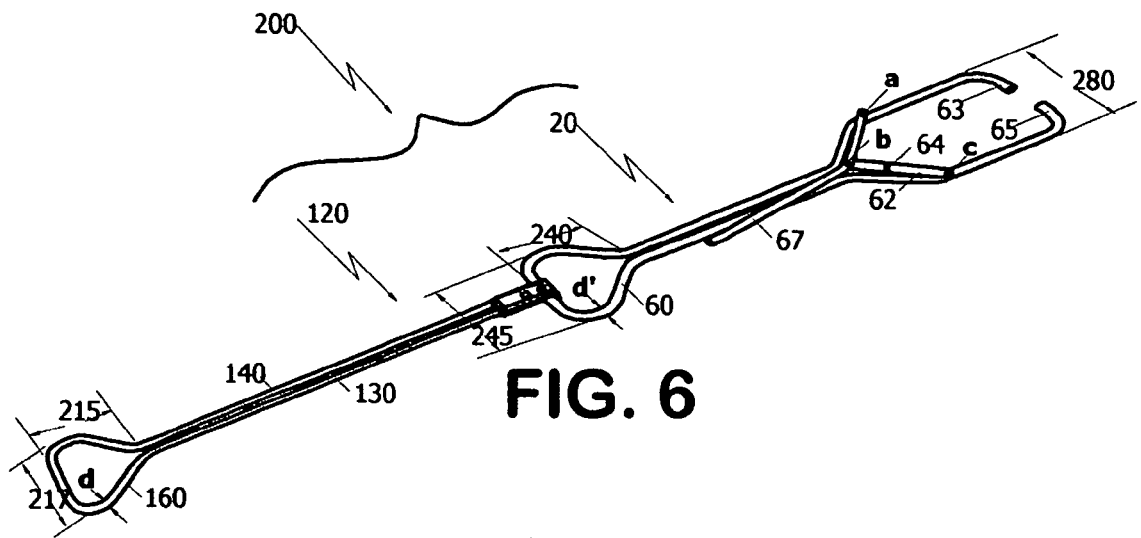
FIGS. 6-8 show an embodiment of the various components and dimensions of the quick-folding compact tow-bar of the present invention.
Figure 7:
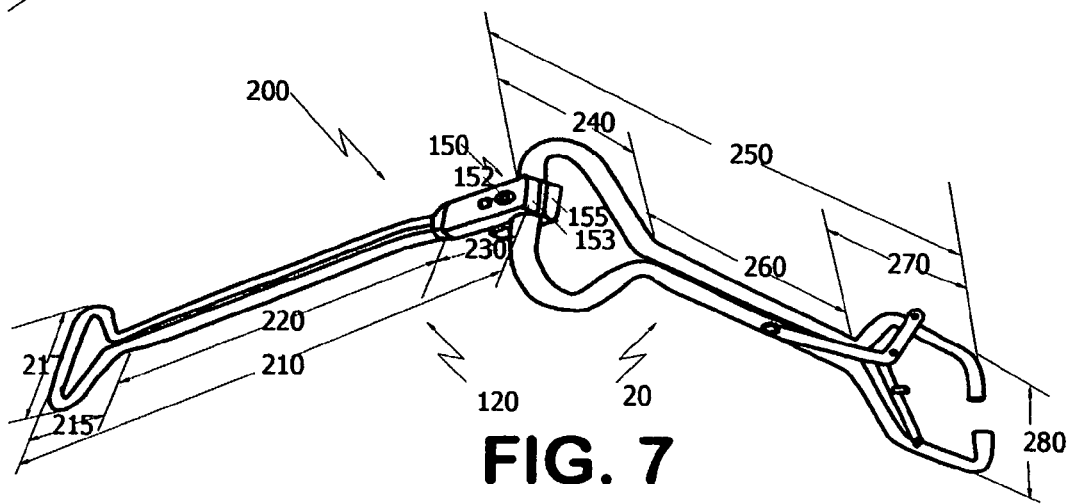

Extension bar, or arm, of second section 120 comprises tubing formed into a U-shape having a handle 160 and two arms 130 and 140 as shown in FIG. 6. The first section 20 and the second section 120 are rotatably connected to each other by means of a joint connector 150. The first section 20 may be a tow-bar used for towing single-engine Cessna airplanes, for example, such as shown in FIGS. 1-3, and first section 20 may be operated accordingly as described earlier with reference to same numerals referring to similar parts as in FIG. 6. (It will be noted that, in general, numerals referring to parts are shown in FIG. 6, while numerals referring to dimensions of the parts are shown in FIG. 7).

In operation, extension arm 120 rotates about a joint connector 150 as it unfolds from its primary tow-bar 20. A pin inserted through an opening in the joint connector 150, as described more fully below, holds the extension arm 120 and the primary tow-bar 20 erect and straight relative to each other. The open ends 63 and 65 of primary tow-bar 20 are then hooked onto lugs (not shown) of the strut 30. The airplane may now be towed by an operator 100 with ergonomically best positioned body and arms 103 and 105 and free from the path of propeller 80.

Though not limited to, the over-all length 210 of the extension arm 120 is from about 34 to 34¾ inches. The outside diameter "d" of the tubing for extension arm 120 is preferably from about ½ to about ⅝ inches with 1/16 inch wall thickness. The U-shaped extension arm 120 is formed to have a bulbous handle 160 at the closed end with a length 215 from about 6 to about 6½ inches, and width 217 from about 7½ to about 7¾ inches. Mid-section comprising arms 130 and 140 have a length from about 23½ to about 24 inches, while the joint connector 150 has a length 230 from about 3½ to 4 inches.

Figure 8:
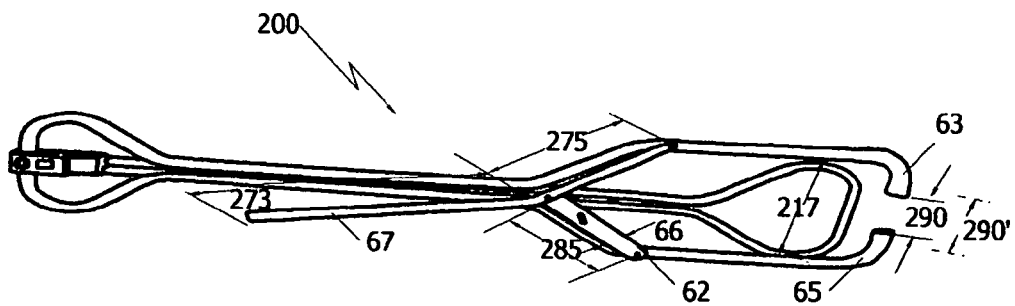

It will be noted that the over-all length 250 of the primary tow-bar 20 of the first section of the quick-fold tow-bar 200 is from about 36 to about 36½ inches so that when extension arm 120 is folded, the handle 160 of the extension arm 120 fits snugly inside the legs 63 and 65 of primary tow-bar 20 (See FIG. 8). This is because, the outside dimensions 270 and 280 of the open end of the primary tow-bar 20 are from about 14 to about 14½ inches, and from about 9 to about 9½ inches, respectively, to accommodate the smaller handle 160 of the extension bar 120. The extension arm 120 folds away from the side that carries the lever 217 of the primary tow-bar 20 of the first section of the quick-fold tow-bar 200 of the invention. As described earlier, lever 67 operates with three pivot points "a", "b" and "c". Lever 67 has a labeled length 273 from the tip of the handle to pivot point "b" from about 11 to about 11½ inches, and a labeled length 275 from pivot point "b" to pivot point "a" from about 6 to 6½ inches, and operates the legs 63 and 65 with plate 62 pivoting about points "c" and "b". Plate 62 has a labeled length 285 from about 6 to 6½ inches. The width 66 of plate 62 is from about 1 to about 1⅛ inches and the thickness is approximately 1/16 of an inch. The tubing for the primary tow-bar 20 has an outside diameter "d'" from about ¾ to about ⅞ inches with 1/16 inch wall thickness.

Figure 9:
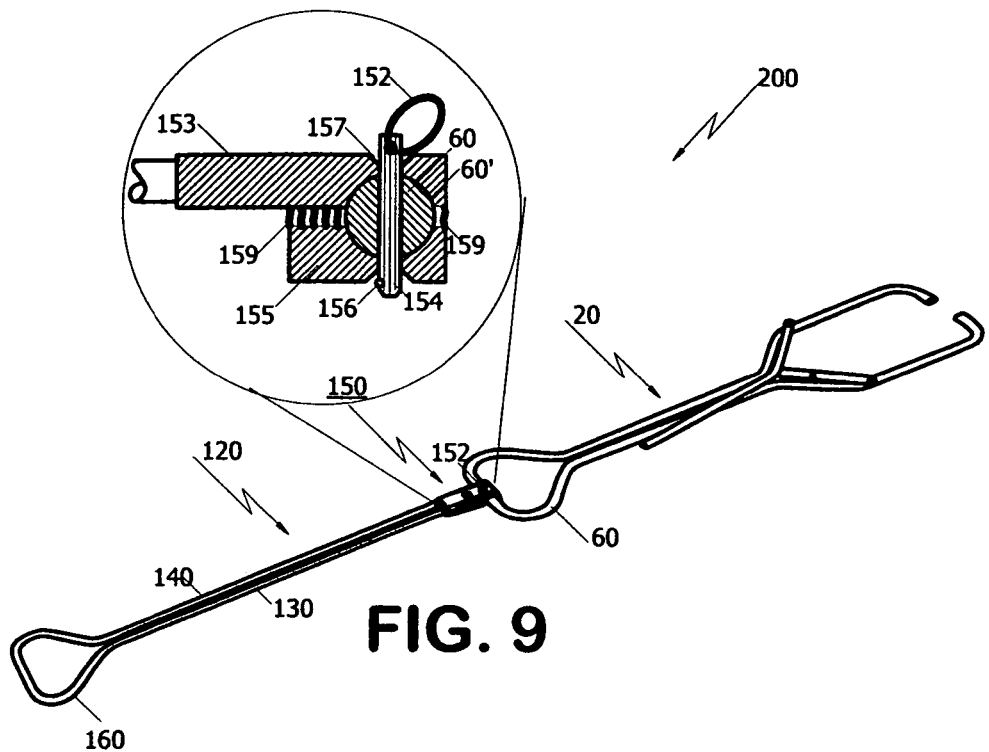
FIG. 9 shows an embodiment of a joint connector of the quick-folding compact tow-bar of the present invention.

In one aspect, the joint connector 150, shown in enlarged cross-section in FIG. 9, comprises an upper rectangular plate portion 153, preferably, though not limited to, aluminum whose one end is fixedly (e.g., by soldering, welding or other fastening means) attached to the arms 130 and 140 of the extension arm 120 of the second section of the quick-fold compact tow-bar 200 of the present invention. Upper rectangular portion 153 has a width 230 from about 3½ to 4 inches. A lower plate portion 155 of the same material as the upper portion 153 is shorter by about 2 inches to allow room to fasten the arms 130 and 140 to the joint connector 150. The preferred aluminum pieces have a thickness of about ½ inch, so that when they are held together, they provide a proper thickness to form an encasement cavity 60' to accept handle 60 of the primary tow-bar 20. After plates 153 and 155 are placed to encase handle 60, they are welded together while leaving handle 60 rotatable within the cavity 60' in between plates 153 and 155, thus completing the joint connector 150.

An aspect involves making the extension bar 120 stationary with respect to primary tow-bar 20 when pulling or pushing an airplane with the quick-fold compact tow-bar 200 of the present invention. This is accomplished by drilling a hole opening 157 through the assembly of the joint connector 150, including the handle 60 of the primary tow-bar 20 while holding the extension bar 120 and the primary tow-bar 20 straight, and then inserting a pin 154 as shown in FIG. 9. Referring to the mating hole opening formed in handle 60 with reference numeral 157', it will be understood that a set of one or more openings (not shown) may be formed in handle 60 such that the second set of one or more openings (not shown) can be lined up with the first set of openings 157 formed in upper 153 and lower 155 plates in order to lock the primary tow-bar 20 relative to the extension bar corresponding to the position of the openings that are engaged by means of pin 154. (See, for example, the semi-folded position shown in FIG. 7).

Pin 154 has a ring 152 for ease of inserting and removing the pin 154 from the joint connector 150. A ball 156 helps secure pin 154 in the hole. Pin 154 is removed from hole 157 when it is desired to fold the extension bar 120 under the primary tow-bar 20. After folding, pin 154 may be inserted back into hole 157 in order to secure the quick-fold tow-bar 200 in a folded and compact position for storage in the luggage compartment of an airplane, such as shown in FIG. 11.

Figure 11:
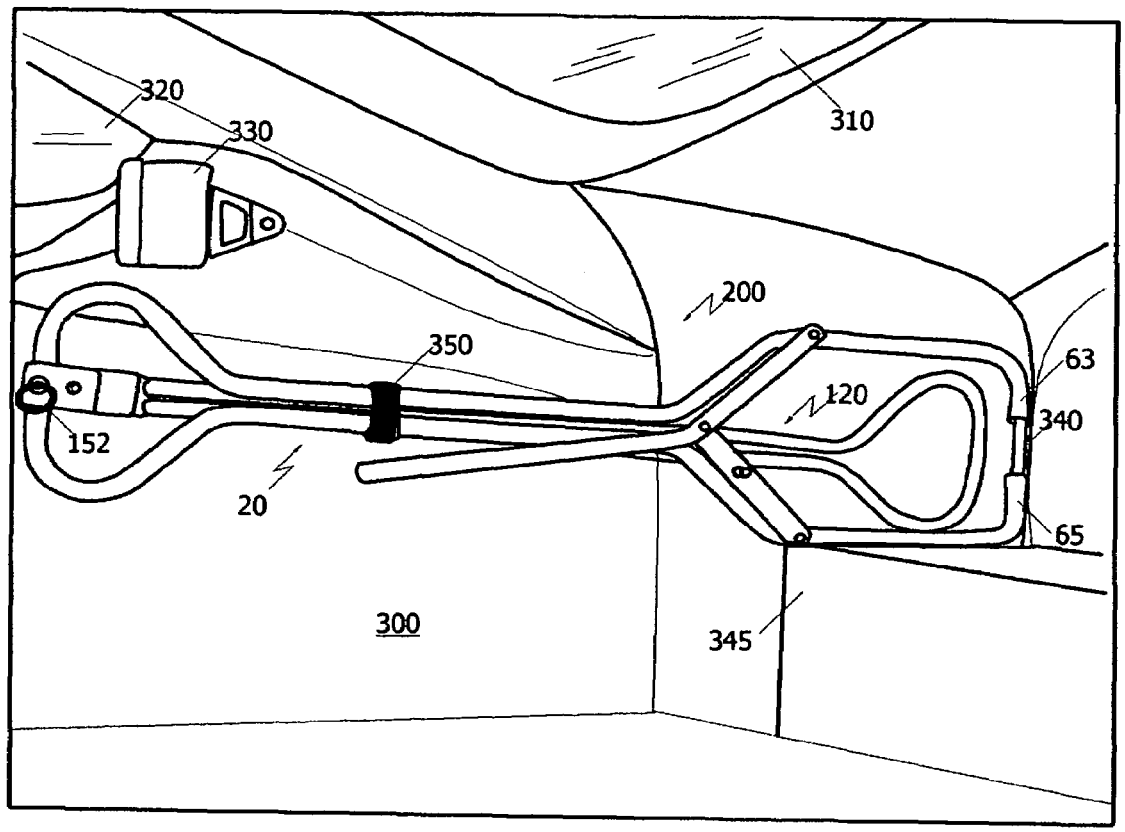
FIG. 11 shows the stowing away of the quick-folding compact tow-bar of the present invention in a luggage compartment of a single-engine airplane, according to the present invention.

In FIG. 11, a luggage compartment 300 of a single-engine Cessna airplane is shown. Although the luggage compartment 300 shown in FIG. 11 is towards the rear of the airplane where rear window 310 and side window 320 along with seat belt 330 for the rear seats may be seen, the quick-fold compact tow-bar of the present invention may be used in other types of luggage compartments in other locations of the airplane. The quick-fold compact tow-bar 200 of the present invention is brought into compartment 300 through a luggage door (not shown, but facing the reader) just big enough to accommodate the folded quick-fold tow-bar 200. The tubing at the open ends 63 and 65 of the quick-fold tow-bar 200 are hooked onto a receiving station 340 located towards the rear walls of the luggage compartment 300 and above a shelf 345, though other means can be provided to rest that end of the quick-fold tow-bar 200. The middle portions of the quick-fold compact tow-bar 200 are then secured to the side wall of compartment 300 by, for example, Velcro™ loops 350, as depicted in FIG. 11. Other quick fastening means, too many to cite here, can also be employed. It will be noted that in FIG. 11, pin 152 is shown in place holding the primary tow-bar of the first section 20 and the extension bar of the second section 120 of the quick-fold compact tow-bar of the present invention 200 in a compactly folded position.

Figure 10:
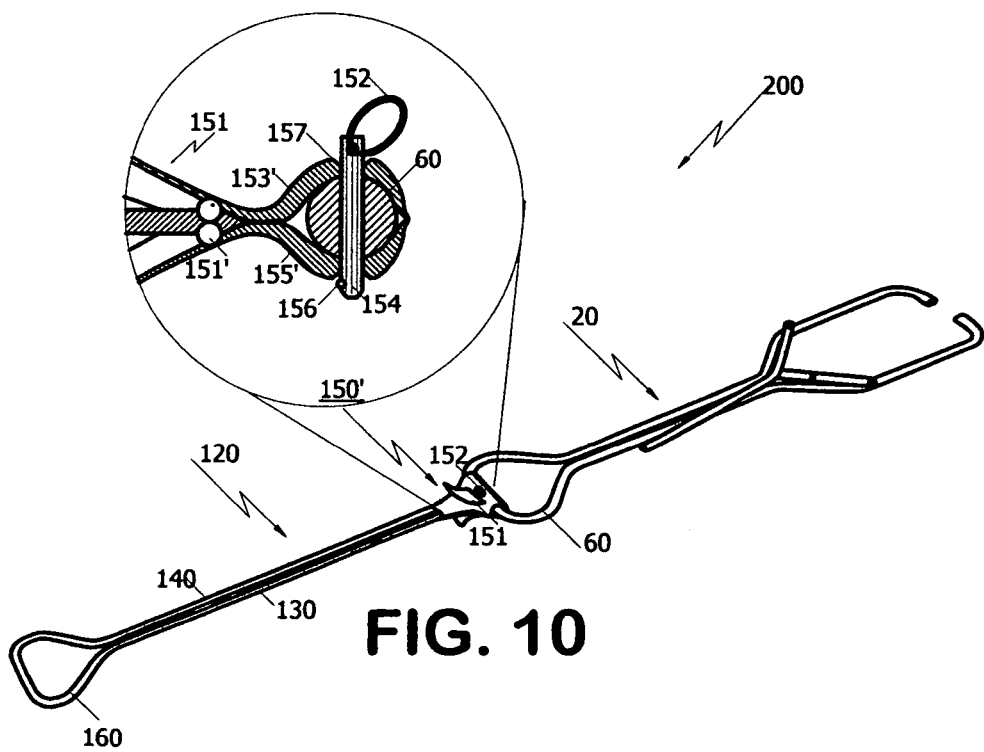
FIG. 10 shows another embodiment of a joint connector of the quick-folding compact tow-bar of the present invention.

Another embodiment involves a joint connector 150 comprising a clamp type connector 151, as shown in FIG. 10. In the enlarged cross-section 150 shown in FIG. 10, clamp 151 comprises an upper jaw 153' and a lower jaw 155'. When tabs or levers 151 on the clamp are squeezed together, spring-loaded jaws 153' and 155' open to receive handle 60 of the primary tow-bar 20, as shown in FIG. 10. An aspect involves making the clamp strong enough to prevent handle 60 from rotating when towing an airplane, and yet sufficiently movable in order to adjust the position of extension bar 120 relative to primary tow-bar 20. Another aspect involves drilling a hole 157 while holding the extension bar 120 and the primary tow-bar 20 straight and inserting a pin 154, as shown in FIG. 10, and as described above.

Still another aspect involves the portability of the quick-fold compact tow-bar 200 of the present invention. Namely, extension bar 120 with a damp type connector 151 may be used with, and quickly released with quick release levers from one tow-bar and transported to be used with another type of tow-bar whose handle can be grabbed by clamp 151. It will be appreciated that a clamp type connector may include variouss clamping devices with levers including, for example, a lever cam such as shown at http:www1.mscdirect.com/CGI/GS-DRVSM?PACACHE=000000055809677.

Figure 12:
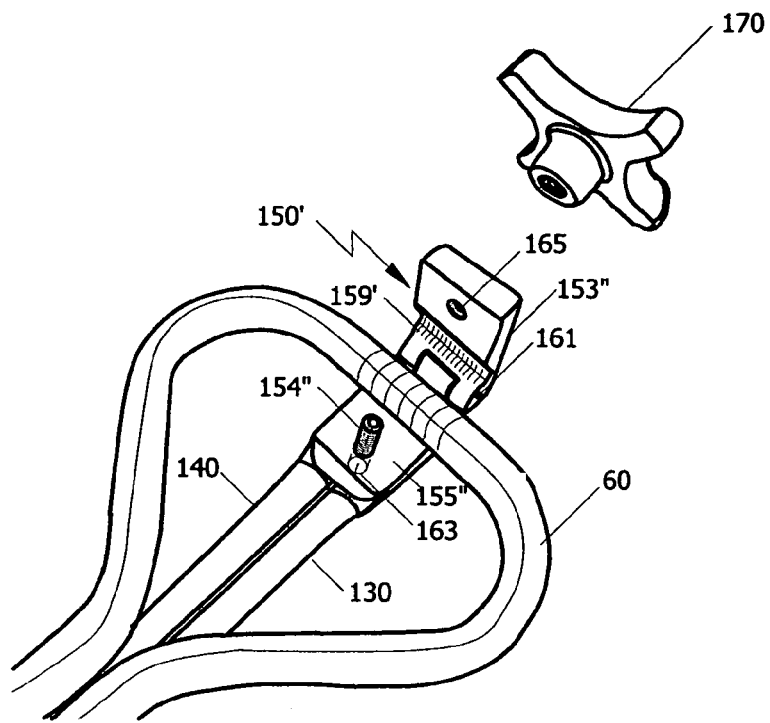
FIG. 12 shows an embodiment of a joint connector having a hinged two-piece enclosure for attaching an extension arm of the present invention to a primary tow-bar.
Figure 13:
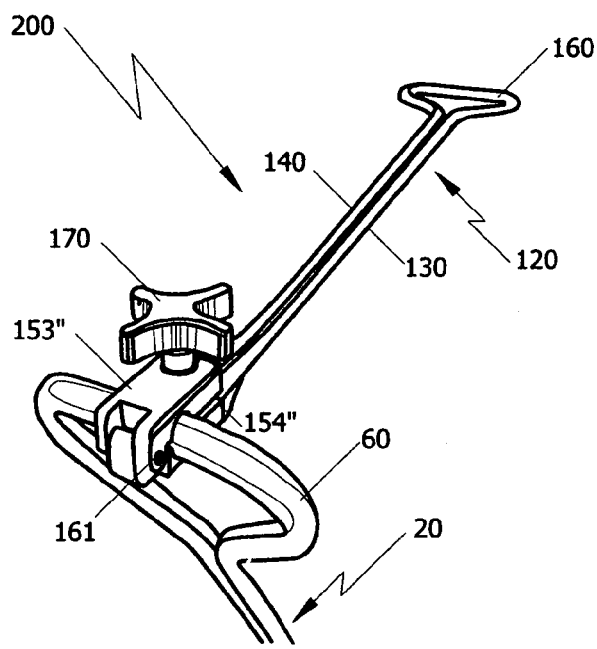
FIG. 13 shows the closure of the enclosure of FIG. 12 onto the primary tow-bar to provide a foldable compact tow-bar of the present invention.

Though these numerous details of the disclosed apparatus and method are set forth here, such as physical dimensions of the quick-fold compact tow-bar and steps of erecting the same, to provide an understanding of the present invention, it will be obvious, however, to those skilled in the art that these specific details need not be employed to practice the present invention. For example, the arms and legs of the extension bar and primary tow-bar, respectively, need not be of tubular shape. It may be of any polygonal or cylindrical shape. Furthermore, the joint connector 150 shown in FIG. 9 may be configured to have an upper rectangular plate portion 153" and a lower rectangular plate portion 155", which are held together rotatively by means of a shaft 161 as shown in FIG. 12, and better seen in FIG. 13. The embodiment shown in FIGS. 12 and 13 comprise a hinged two-piece enclosure 150' having a rotatable fastener 170. It will be noted that the lower portion 155" is fixedly attached to the extension arms 140 and 130 at one end, as in embodiments shown in FIGS. 6-11. The upper portion 153" is then lowered onto the lower portion 155" while handle 60 is captured between an upper jaw 159' (similar to ypper jaw 159 of FIG. 9) and opposing lower jaw (hidden under handle 60 in FIG. 12). Then a threaded bolt 154" having a shoulder and a head (not shown) is inserted through an opening 163 (shown in phantom in FIG. 12) in the lower portion 155" and a mating opening 165 in the upper jaw 153", at the same end the extension bar is connected to the lower portion 155" shown in FIG. 12. A mating fastener, in the form of, but not limited to a knob 170 is then screwed onto bolt 154" to secure extension arms 130 and 140 (comprising second section 120) tightly at any desired angle with respect to the first section 20 of the quick-fold compact tow-bar 200 of the present invention. At the same time, it will be evident that the quick-fold compact tow-bar may be used for towing vehicles other than airplanes. Furthermore, parts of the quick-fold compact tow-bar may be used separately, namely, the extension bar part may be used singly by attaching to other tow-bars, which are too many to cite.

That is, while the invention has been particularly shown and described with reference to a particular embodiment(s), it will be appreciated that variations of the above-disclosed embodiment(s) and other features and function, or alternatives thereof, may be desirably combined into many other different systems or applications Also that various presently unforeseen and unanticipated alternatives, modifications, variations or improvements therein may be subsequently made by those skilled in the art which are also intended to be encompassed by the following claims.

What is claimed is:

1. An apparatus comprising
   a quick-fold compact tow-bar, the compact tow-bar further comprising a primary tow-bar and an extension arm;
   a joint connector having a first end and a second end;
   a first set of openings formed through the joint connector; wherein
   the first end of the joint connector configured to rotatably receive a first handle of the primary tow-bar, the first handle having one or more second set of openings;
   the second end of the joint connector configured to fixedly receive a free end of the extension arm; and
   a second handle opposing the free end of the extension arm for towing an object.

2. The apparatus according to claim 1, wherein the joint connector comprises an upper portion and a lower portion, each portion configured at the first end of the joint connector to rotatably encase the first handle, including the one or more second set of openings, of the primary tow-bar.

3. The apparatus according to claim 1, wherein the openings through the joint connector are formed in the lower and upper portions of the connector in line with each other to allow a pin to be inserted through the openings.

4. The apparatus according to claim 1, wherein openings formed in-line with each other in the upper and lower portions of the joint connector allow a pin to be inserted through any one of the one or more openings in the encased handle of the primary tow-bar in order to lock the primary tow-bar in any one of the one or more fixed positions with respect to the extension bar.

5. The apparatus according to claim 1, wherein the first end comprises a clamp capable of receiving and quick-releasing the handle of the primary tow-bar.

6. An apparatus comprising
   a U-shaped extension bar having a closed end, an open end and a mid-section;
   the closed end forming a bulbous handle with arms close together extending into the mid-section and ending at the open end of the extension bar;
   a mechanism attached to the open end, the mechanism configured to have jaws for grabbing and releasing an object; and
   wherein the mechanism further comprises a hinged two-piece enclosure having a rotatable fastener to apply force to secure the object.

7. The apparatus according to claim 6, wherein the object is an airplane tow-bar handle.

\* \* \* \* \*